W. SMEDLEY.
DEVICE FOR DRIVING SHAFTS.
APPLICATION FILED JAN. 24, 1920.

1,379,941.

Patented May 31, 1921.

Inventor.
Walter Smedley.

UNITED STATES PATENT OFFICE.

WALTER SMEDLEY, OF CREWE, ENGLAND.

DEVICE FOR DRIVING SHAFTS.

1,379,941. Specification of Letters Patent. Patented May 31, 1921.

Application filed January 24, 1920. Serial No. 353,856.

*To all whom it may concern:*

Be it known that I, WALTER SMEDLEY, a subject of the King of Great Britain, and a resident of Crewe, England, have invented certain new and useful Improvements in Devices for Driving Shafts, of which the following is a specification.

This invention relates to power shafting and consists in combining with such shafting a rotatably mounted mass in a manner such that the kinetic energy of the rotating mass may be absorbed during one arc of movement and redelivered to the rotating mass and shaft during another arc of movement, the energy which is reimparted to the shaft being given out at a greater mean leverage than that at which the said energy was absorbed.

According to this invention, the shaft which may be the power shaft of a prime mover, or other rotating shaft, is fitted with one or more crank disks or the like which are mounted eccentrically with reference to a radially slotted disk or disks with which the pin of the crank disk or analogous element is adapted to engage. The slotted disk or disks are disposed on a shaft separate from the main shaft and such slotted disk shaft may be provided with a fly wheel or otherwise. By reason of the fact that the crank disk or disks shaft is out of center in respect to the slotted disk shaft the effective throw of the crank pin in the slots varies as the disks rotate. This variation is taken advantage of and is utilized when the pin or the like is at its minimum mean effective crank distance to cause the energy which is then being imparted to the eccentric disk driven by the main shaft to raise a weight, compress a spring, or some fluid, so that the energy thus imparted by the main shaft to the eccentric disk on the one stroke may be stored as potential energy and subsequently returned to the main shaft on the reverse stroke, the eccentric disk then helping to drive the main shaft, the crank pin on the disk or the like being on this reverse stroke at a greater radial distance from the center of the slotted disk shaft than it was on the forward stroke, so that the energy previously stored is now imparted at a greater mean leverage, and in this way the energy is returned more effectively to the main shaft and the twisting effort developed by the shaft during certain portions of its rotation is increased.

Figure 1:
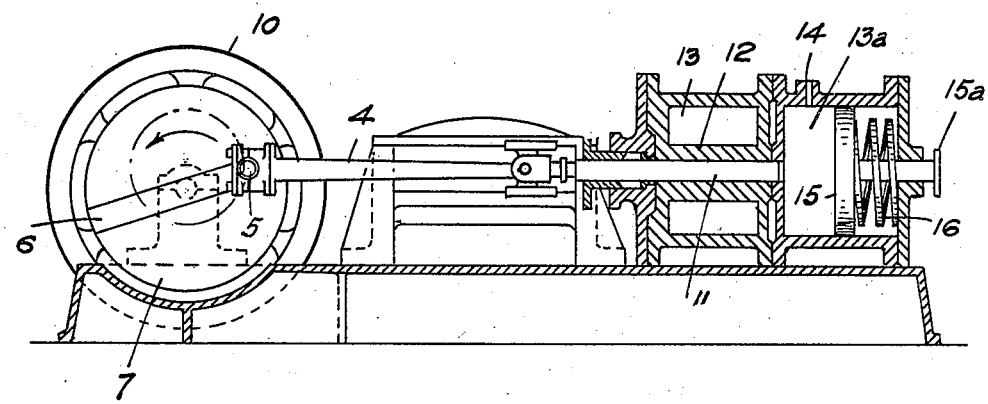
Figure 2:
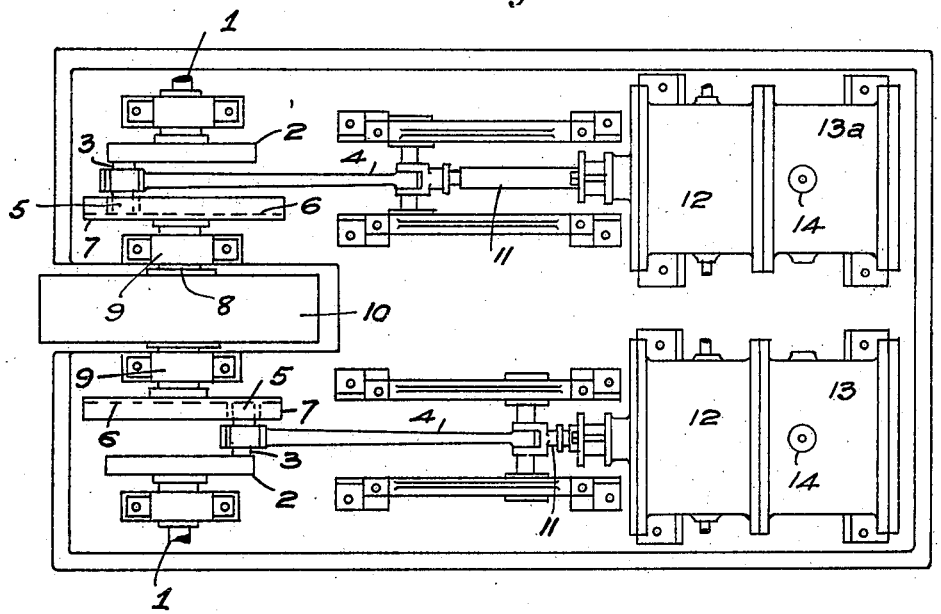

The invention is illustrated in the accompanying drawings in which Figure 1 is an elevation of an apparatus suitable for carrying out the present invention showing the power shaft and rotating mass or fly wheel connected up through a connecting rod and plunger to a compression cylinder, the latter being shown in section, and Fig. 2, is a plan view of Fig. 1.

In the arrangement shown in the drawings the main shaft 1 is provided with two crank disks 2 the crank pins 3 of which are engaged by the connecting rods 4. The crank pins 3 as shown are opposed diametrically to each other and the further ends 5 of the crank pins engage diametral slots 6 in the disks 7 mounted on a shaft 8 journaled in bearings 9 and fitted with a fly wheel 10 if desired. The connecting rods 4 are coupled up to the plungers 11 which reciprocate in the small bore cylinders 12, water jacketed if desired at 13. These small bore cylinders 12 communicate with the larger cylinders 13$^a$ provided with a fluid inlet 14 and if desired with an outlet. A resiliently controlled piston or plunger 15 with a rear spring 16 may be fitted in the enlarged cylinder 13$^a$.

In operation, supposing the main shaft 1 to be driven in the direction of the arrow, a compression will be set up on the fluid in the cylinders 12, 13$^a$ as the shaft 1 rotates, the crank pin 3 forcing in the plunger 11. This inward movement of the plunger is effected while the crank pin 3 is at a minimum mean effective distance from the shaft 8 and stores energy by compressing the fluid in the cylinders, the excess fluid being stored in an accumulator or the spring 16 absorbing the energy. This is given out on the return stroke and owing to the fact that the mean radial distance of the crank pin 3 from the center of the shaft 8 on such return stroke is greater than on the compression stroke the energy which has been previously stored is now reimparted at a greater leverage.

Such an auxiliary arrangement would be of considerable advantage in the case of, say, shafts which have to do unequal work during each revolution, means such as described enabling potential energy to be stored on the light portion of the revolution and usefully imparted when the heavy load is encountered.

I claim,

1. In combination with a power shaft, a crank pin on the power shaft, a slotted rotatable element eccentric to the power shaft and engaged by the crank pin, and means interconnected with said pin to store energy imparted during one arc of movement of the element which energy is reimparted at a greater mean leverage to the power shaft during another arc of movement.

2. In combination with a power shaft, a crank pin on the power shaft, a slotted rotatable element, eccentric to the power shaft and engaged by the crank pin, and a plunger interconnected with said pin adapted to compress a fluid during one arc of movement of the slotted element, which compression energy is reimparted at a greater mean leverage to the power shaft during another arc of movement.

3. In combination with a power shaft, a crank pin on the power shaft, a slotted rotatable element eccentric to the power shaft and engaged by the crank pin, a plunger connected to the crank pin, a cylinder for said plunger, a second cylinder of larger diameter open to and axial with the plunger cylinder, both cylinders containing fluid, a resilient element in the larger cylinder storing energy during one arc of movement of the slotted element, which energy is reimparted at a greater mean leverage to the power shaft during another arc of movement.

In testimony whereof I affix my signature in presence of two witnesses.

WALTER SMEDLEY.

Witnesses:
 A. J. DAVIES,
 E. HIGINBOTHAM.